United States Patent
Zhang et al.

(10) Patent No.: US 10,200,814 B1
(45) Date of Patent: Feb. 5, 2019

(54) VORONOI DIAGRAM-BASED ALGORITHM FOR EFFICIENT PROGRESSIVE CONTINUOUS K-NEAREST NEIGHBOR QUERY FOR MOVING OBJECTS

(71) Applicants: Mingjin Zhang, Miami, FL (US); Naphtali Rishe, Miami Beach, FL (US); Weitong Liu, Redwood City, CA (US); Jahkell Lazarre, Miami, FL (US)

(72) Inventors: Mingjin Zhang, Miami, FL (US); Naphtali Rishe, Miami Beach, FL (US); Weitong Liu, Redwood City, CA (US); Jahkell Lazarre, Miami, FL (US); Tao Li, Coral Gables, FL (US)

(73) Assignee: The Florida International University Board of Trustees, Miami, FL (US)

( * ) Notice: Subject to any disclaimer, the term of this patent is extended or adjusted under 35 U.S.C. 154(b) by 0 days.

(21) Appl. No.: 15/960,797

(22) Filed: Apr. 24, 2018

(51) Int. Cl.
*G06F 17/30* (2006.01)
*H04W 4/021* (2018.01)
*G06K 9/62* (2006.01)

(52) U.S. Cl.
CPC ...... *H04W 4/021* (2013.01); *G06F 17/30241* (2013.01); *G06F 17/30958* (2013.01); *G06F 17/30961* (2013.01); *G06F 17/30988* (2013.01); *G06K 9/6276* (2013.01)

(58) Field of Classification Search
CPC ......... G06F 17/30241; G06F 17/30958; G06F 17/30961; G06F 17/30988; G06K 9/6276; H04W 4/021
USPC ..................................................... 707/713
See application file for complete search history.

(56) References Cited

U.S. PATENT DOCUMENTS

| | | | | |
|---|---|---|---|---|
| 7,299,126 | B2 * | 11/2007 | Gedik | G06F 17/30333 342/357.62 |
| 8,090,745 | B2 * | 1/2012 | Hayashi | G06F 17/30241 707/797 |
| 8,099,380 | B1 * | 1/2012 | Shahabi | H04W 4/023 455/456.1 |
| 8,266,132 | B2 * | 9/2012 | Ofek | G06K 9/00476 345/629 |
| 8,566,030 | B1 * | 10/2013 | Demiryurek | G01C 21/3492 701/409 |
| 9,043,927 | B2 * | 5/2015 | Hu | H04W 12/06 726/26 |
| 2005/0285764 | A1 * | 12/2005 | Bessette | G10L 19/10 341/143 |

(Continued)

OTHER PUBLICATIONS

Guttman, "R-trees: a dynamic index structure for spatial searching," Proceedings of the 1984 ACM SIGMOD International Conference on Management of Data, Jun. 1984, pp. 47-57.

(Continued)

*Primary Examiner* — Thanh-Ha Dang
(74) *Attorney, Agent, or Firm* — Saliwanchik, Lloyd & Eisenschenk

(57) ABSTRACT

Methods and apparatuses for providing a k-nearest neighbor for location based services are provided. A method can include querying a database to detect a plurality of interest points within a predetermined distance of the user device using a kNN algorithm, organizing the interest points within a Voronoi tree, and continuously return a position specific result of relevant interest points.

20 Claims, 7 Drawing Sheets

(56) References Cited

U.S. PATENT DOCUMENTS

2013/0218789 A1* 8/2013 Guo ................ G06Q 50/26 705/317
2014/0090023 A1* 3/2014 Hu ................. H04W 12/06 726/4
2015/0248450 A1* 9/2015 Akdogan ........ G06F 17/30327 707/743
2018/0137155 A1* 5/2018 Majumdar ....... G06F 17/30587

OTHER PUBLICATIONS

Sellis et al., "The R+-tree: a dynamic index for multi-dimensional objects," International Conference of Very Large Data Bases, Aug. 1987, pp. 1-24.

Beckmann et al., "The R*-tree: an efficient and robust access method for points and rectangles," Proceedings of the 1990 ACM SIGMOD International Conference on Management of Data, May 1990, pp. 322-331.

Roussopoulos et al., "Nearest neighbor queries," Proceedings of the 1995 ACM SIGMOD International conference on Management of Data, May 1995, pp. 71-79.

Tao et al., "Time-parameterized queries in spatio-temporal databases," Proceedings of the 2002 ACM SIGMOD International Conference on Management of Data, Jun. 2002, pp. 1-12.

Hijaltason et al., "Incremental distance join algorithms for spatial databases," Proceedings of the 1998 ACM SIGMOD International Conference on Management of Data, Jun. 1998, pp. 237-248.

Bespamyatnikh et al., "Queries with segments in voronoi diagrams," Computational Geometry, May 2000, pp. 23-33, vol. 16.

Tao et al., "Continuous nearest neighbor search," Proceedings of the 28th International Conference on Very Large Data Bases, Aug. 2002, pp. 1-12.

Mouratidis et al., "Conceptual partitioning: an efficient method for continuous nearest neighbor monitoring," Proceedings of the 2005 ACM SIGMOD International Conference on Management of Data, Jun. 2005, pp. 1-12.

Kulik et al., "Incremental rank updates for moving query points," International Conference on Geographic Information Science, Sep. 2006, pp. 251-268.

Sharifzadeh et al., "VoR-Tree: R-trees with voronoi diagrams for efficient processing of spatial nearest neighbor queries," Proceedings of the Very Large Data Bases Endowment, Sep. 2010, pp. 1-12, vol. 3.

* cited by examiner

US 10,200,814 B1

VORONOI DIAGRAM-BASED ALGORITHM FOR EFFICIENT PROGRESSIVE CONTINUOUS K-NEAREST NEIGHBOR QUERY FOR MOVING OBJECTS

STATEMENT OF GOVERNMENT SUPPORT

This invention was made with government support under #1213026 awarded by National Science Foundation. The government has certain rights in the invention.

BACKGROUND

Modern technology allows moving object data to be collected easily and extensively. Applications that deal with moving object data (e.g., traffic monitoring, flight control, and location-based advertisement and recommendation) typically require location-based services (LBS). LBS involve querying for the historical, current, or predicted future locations of moving objects.

BRIEF SUMMARY

Embodiments of the subject invention provide methods and apparatuses that return the result of a query to a user device. Continuous output and maintenance of the predictive query results can be provided while the query point is moving.

Embodiments also provide methods and apparatuses that can retrieve the k nearest neighboring (kNN) query result to every point on the path of a moving object. The result is position- and/or time-dependent and can change when the order of the data objects' relative distances change. CkNN queries can be utilized for many location-based applications.

Embodiments provide methods and apparatuses that are scalable, use minimal resources of a CPU, IO, and memory, for applications on servers handling large amounts of queries (e.g., large-scale online LBS map services) and applications on devices with limited CPU and memory (e.g., GPS navigation devices with embedded systems).

DETAILED DESCRIPTION

Embodiments of the subject invention provide progressive algorithms that report the result of a CkNN query of the algorithm to a user. This progressive approach can return a large data set, as computing and outputting a large result at one time can be very time-consuming. Continuous output and maintenance of the predictive query results can be provided while the query point is moving. Generally, a query point's trajectory (or path) comprises many small line segments. For each segment, traditional methods need to post a new query, which can be very expensive. Embodiments of the subject invention can post one query for all segments in the path (i.e., only a one-time tree traversal in the algorithm).

Continuous k nearest neighbor (CkNN) query is a technology in the spatial database realm and useful in location-based applications. For some applications, there is interest in time-dependent locations. In other cases, there is interest in the object's extent change over time. In these situations, moving points and moving regions are the abstractions. Cars, airplanes, ships, animals, and mobile phone users are considered moving points while forest fires, and the spread of epidemic diseases, are considered moving regions.

CkNN can retrieve the k nearest neighboring (kNN) query result to every point on the path of a moving object. The result is position- or time-dependent and can change when the order of the data objects' relative distances change. CkNN queries can be utilized for many location-based applications. For example, "If I continue moving in this direction, what will be my closest restaurants for the next 10 minutes?" or "What will be my nearest gas station at any point during my route from city A to city B?". An interest point can represent but is not limited to the following: a hospital(s), medical office(s), restaurant(s), gas station(s), landmark(s), hotel(s), structure(s), service provider(s), vendor(s), retailer(s), or store(s), or any combination thereof.

The progressive continuous k nearest neighbor (PCkNN) query continuously searches for k nearest objects while a point is moving along a specified path. For a PCkNN query, each element in the result set can be expressed as the following two-component tuple:

$$\text{result}[i] = <[A,B],(NN1,NN2,\ldots,NNk)>(i=0,1,2,\ldots) \quad (1)$$

Figure 2:
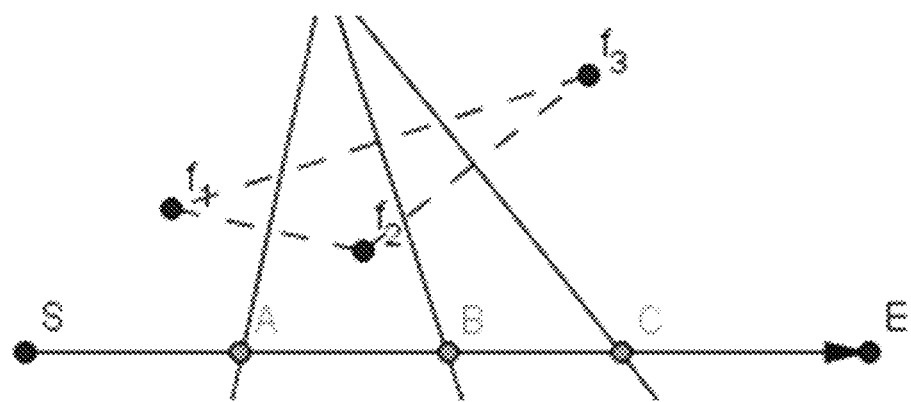
FIG. 2 shows an example of the generation of split points using the perpendicular bisectors between interest points with respect to the query trajectory in a PCkNN query.

Points A and B are located in the query segment. Formula 1 states that for an arbitrary point Q between A and B in the query segment, it's k-NN is (f1, f2, ..., fk), which are the Q's k nearest neighbors. The distances between Q and its k nearest neighbors are incremental. The sequence (NN1, NN2, ..., NNk) is defined as a kNN-Sequence. As shown in FIG. 2, a result of this PC3NN query can be:

$$\text{result}=\{<(S,A),(f1,f2,f3)>,<(A,B),(f2,f1,f3)>,<(B,C),(f2,f3,f1)>,<(C,E),(f3,f2,f1)>\}. \quad (2)$$

For any two adjacent kNN-Sequences, (e.g., (f1, f2, f3) and (f2, f1, f3)), a difference is the reversal of two adjacent elements, (e.g., f1 and f2). A similar conclusion can be tenable for multiple PCkNN queries.

In a result of a PCkNN query, the kNN-Sequence can change with the continuous movement of the query point on query segment SE. Every change of the kNN-Sequence can be the result of the swapping of two or more adjacent elements in the sequence.

Proof (by contradiction): Assume there's a point A on segment SE. The query point Q is moving from S to E. And for segment |SA|, the kNN-Sequence is $$(f1, f2, \ldots, f_i, f(i+1), \ldots, f(j-1), f_j, f(j+1), \ldots, f_k). \quad (3)$$

For segment |AE|, the kNN-Sequence is $$(f1, f2, \ldots, f_j, f(i+1), \ldots, f(j-1), f_i, f(j+1), \ldots, f_k), \quad (4)$$

in which case the two elements swapped are not adjacent.

It can be inferred that when |QA|→0 (Q gets close to A) with |SQ|<|SA| (Q is still on segment SA), the kNNSequence is (f1, f2, . . . , fi, f(i+1), . . . , f(j−1), fj, f(j+1), . . . , fk). When |QA|→0 with |SQ|>|SA| (Q is on segment AE), the KkNN-Sequence is (f1, f2, . . . fj, j(i+1), . . . , f(j−1), fi, f(j+1), . . . , fk). Since the movement of Q is continuous, dist(A, fi) must be equal to dist(A, fj). According to the definition of kNNSequence, dist(A, fi)<=dist(A, f(i+1))<= . . . <=dist(A, fj). Therefore, dist(A, fi), dist(A, f(i+1)), . . . , dist(A, fj) can be equal to each other. That means for any two points chosen from fi, f(i+1), . . . , fj, denoted as fu and fv, the perpendicular bisector of segment |fufv| must pass A. When Q passes A, the positions of fu and fv in the kNN-Sequence must be reversed, which means any two points from fi, f(i+1), fj must be reversed. Then the kNN-Sequence should be $$(f1, f2, \ldots, fj, f(j-1), \ldots f(i+1), fi, f(j+1), \ldots fk), \quad (5)$$

instead of $$(f1, f2, \ldots, fj, f(i+1), \ldots f(j-1), fi, f(j+1), \ldots fk). \quad (6)$$

This result contradicts the assumption.

Figure 3A:
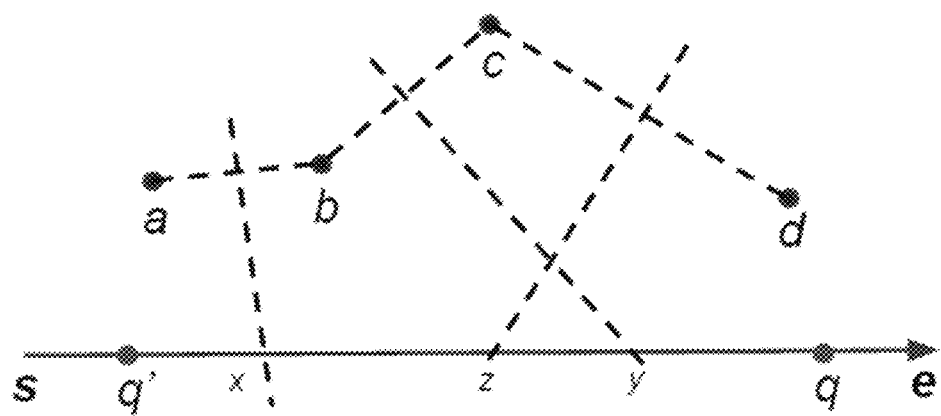
FIG. 3A shows an example of an adjacent swap before a query point passes a particular split point in a PCkNN query.

Referring to FIG. 3A, given a query segment |se|, 4 interest points (a, b, c, d), and query points (q, q') that move from left to right on |se|, the sequence of distances between a query point and interest points can be observed. It should be appreciated by one of ordinary skill in the art that interest points can be generated through interaction with database on an external server or from a localized database. The distance-sorted sequence of interest points in relation to q is a, b, c, d. Comparatively, the distance-sorted sequence of interest points in relation to q' is d, c, b, a. Split points that result from adjacent interest points are generated, hence segments |ab|, |bc|, and |cd| are connected, as seen in FIG. 3A. These split points are swap split points (i.e., the points on the query trajectory at which the order of two adjacent interest points is reversed). Once adjacent elements are swapped, new split points can be generated in accordance to the newly adjacent elements in the sequence; therefore, suggesting that split points can be generated as the query point moves along |se|.

Figure 3B:
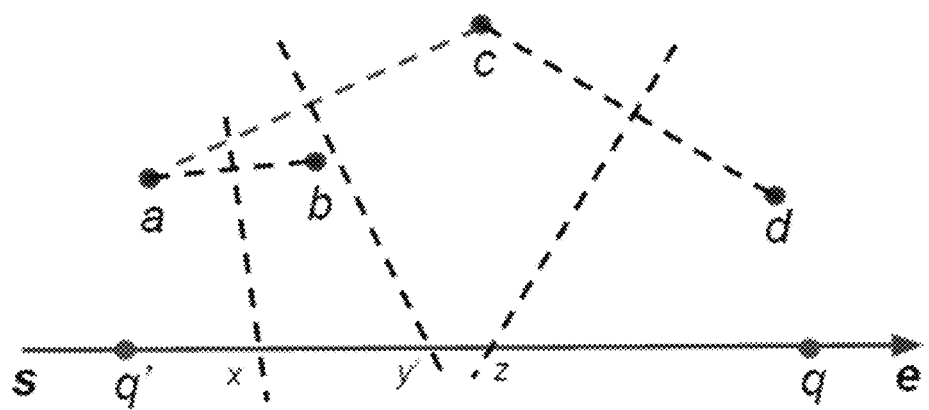
FIG. 3B shows an example of an adjacent swap after a query point passes a particular split point in a PCkNN query.
Figure 4:
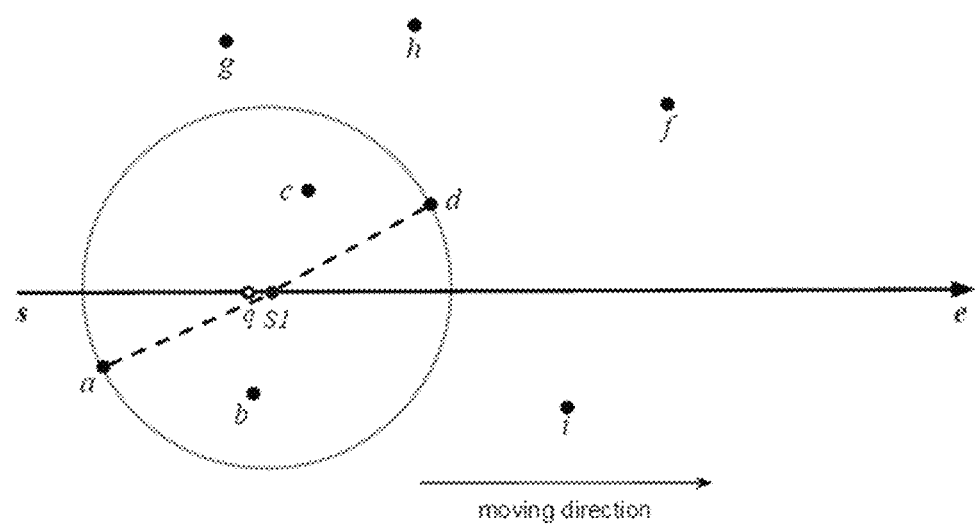
FIG. 4 shows an example of a query point before passing a split point in a CkNN query.

In FIG. 3B, the query point moves to split point x, which results in a and b being swapped. The new sequence of interest points is now shown to be b, a, c, d. Since previously non-adjacent elements (e.g., a and c) are now adjacent and previously adjacent elements are now non-adjacent (e.g., b and c), |bc| can be disconnected and |ac| can be connected. Split point y can be removed temporarily until b and c become adjacent to one another again and a new split point y' can be generated between the newly adjacent elements (e.g., a and c). Repeating these steps on the query interval |se| will output the split points and CkNN progressively.

Figure 5:
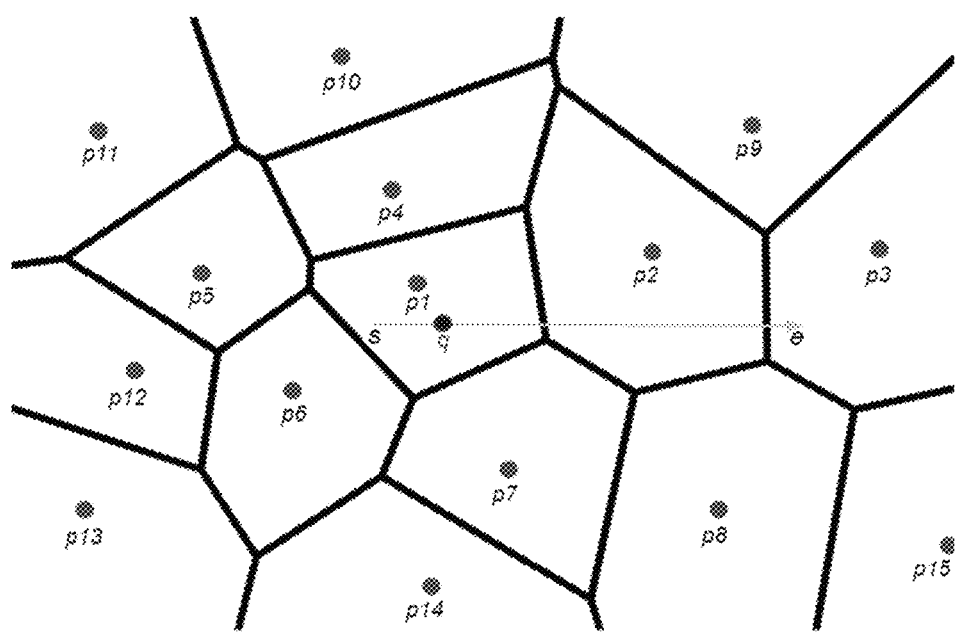
FIG. 5 shows an example of a query point traveling along a segment, using a Voronoi diagram in a 1NN query.

A Voronoi diagram is a partitioning of a plane of points into Voronoi polygons (i.e., convex polygons that each comprises one generating point). As seen in FIG. 5, the points (e.g., p1-p10) are interest points and are also the generators or seeds of the Voronoi diagram. The generator of the Voronoi polygon that contains start point s is the first NN (1NN) of s (e.g., p1 is the 1NN of s). The second NN (2NN) of s is among the adjacent generators of p1 and these generators (i.e., candidate points, p2, p4, p5, p6, and p'7) are adjacent generators of p1 and thus are the candidate points of the 2-NN. The $k^{th}$NN of s is among the union set of adjacent generators of the first determined (k−1) NN generators. For example, suppose p1 and p4 are the first two NNs of s. Then the points in the union set of p1's and p4's neighbors {p2, p7, p6, p5, p10, p9} are the candidate points of the 3NN.

The set of the neighbors of current k-NN can be the candidate points. After all the k-NN and candidate points are sorted, the perpendicular bisector of each pair of adjacent points can be calculated in order to generate split points. For example, if there are k points of NNs and c candidate points, then the number of split points can be k+c−1 (one split point for every pair of adjacent interest points). When a query point q is moving along the query segment, we can maintain k+c interest points and k+c−1 split points. At the point that the k-NN changes, the point that is swapped out can be the current $k^{th}$ NN and the point that is swapped in is the new $k^{th}$ NN.

Embodiments of the subject invention are efficient and can avoid false misses. Certain embodiments can output progressive outputs results that are more favorable to traditional methods including when the query is expensive to execute or the result set is large.

Embodiments of the subject invention are scalable and use minimal resources of a CPU, IO, and memory, for applications on servers handling large amounts of queries (e.g., large-scale online LBS map services) and applications on devices with limited CPU and memory (e.g., GPS navigation devices with embedded systems).

Embodiments of the subject invention can track and output Ck-NN results when the order of kNN changes. Embodiments of the subject invention function for any trajectory and are not restricted to query trajectories that consist of only line segments (e.g., curves, loops, etc.).

Given a query point q moving along some path g, a set of interest points I, and a constant k, a subset of I (or less if data set size is less than k), in which the points are the k closest distance points to q, can be continually returned as part of any tuple in result set R. Path g is a set of any points, in which each point can be a tuple of coordinates. Path g is the trajectory of a query point q represented as a geometric shape, which may be, but is not limited to be, a line segment, polyline, and curve.

A query point or moving object q can travel along path g; the point q can be a tuple of coordinates at any given time and can represent an object in physical or virtual multidimensional space (e.g., a person, an animal, a car, a plane, a smartphone, or a drone). Although this applies to every point p in I, different points in I can be represented by different object types. It is possible for every point p in I to have different object types. Every interest point p in I can be a stationary object (e.g., a gas station, a police station, a restaurant, hotel, or an objective in a videogame).

Constant k can be the maximum number of interest points returned as part of any tuple in result set R. However, the size may be less than k if the data set size is less than k.

PCkNN result set R can be a set of tuples, in which each tuple contains a split point along with a collection of k interest points ordered by their distance to q. An example is R={<s1, {p23, p50, p11, p9}>, <s2, {p50, p23, p11, p9}>, <s3, {p50, p23, p9, p11}>}. In this example, as a query point q passes split point s1, interest point p23 is the 1NN, p50 is the 2NN. R can be updated and the change in R can be progressively returned as q travels along g.

Figure 1:
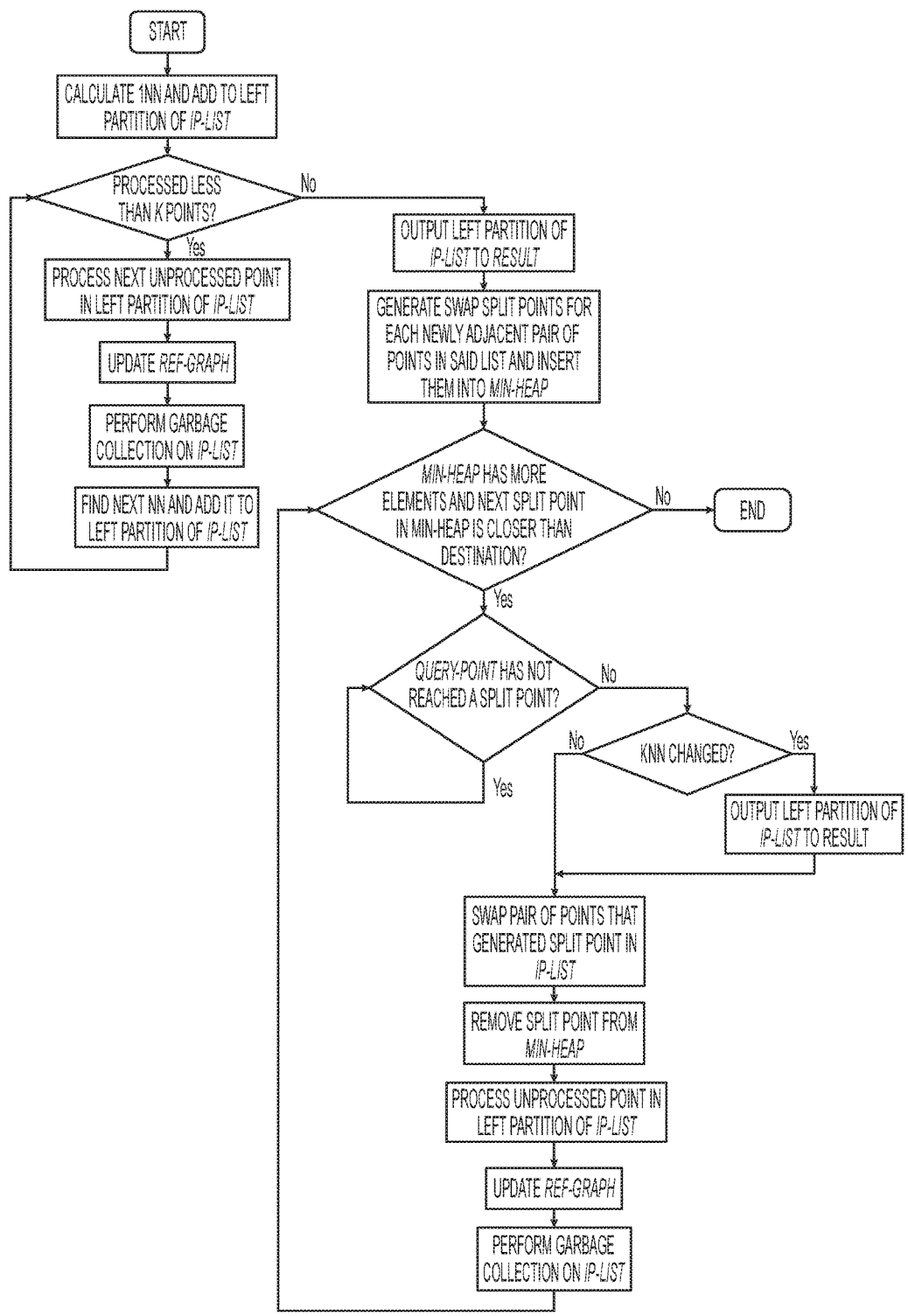
FIG. 1 shows an example of a workflow of PCkNN utilizing a Voronoi diagram to "bound" a set of interest points.

A possible workflow of a PCkNN query with a Voronoi diagram can be seen in FIG. 1. An initial starting point can include binding a set of interest points using a Voronoi diagram. In order to accomplish this, a VoR-tree can be constructed on the spatial database (set of interest points) as in prior to execution of the algorithm. For example, as seen in FIG. 5, the interest points {a, b, c, d, f, g, h, i} can be "bound" using a Voronoi diagram. A next step can be to calculate and process the 1NN.

The 1NN of the query point can be calculated using a Voronoi R-tree algorithm and stored into a linked list of interest points, (hereinafter referred to as IP-List), that can be sorted by distance to the query point in ascending order. A linked list can be a linear data structure such that each element is a node that contains data and a pointer or reference to the next node. The IP-List can be divided into two partitions: a left kNN-Partition and a right Candidate-Partition. The kNN-Partition can contain the current k nearest interest points (k-NN), while the Candidate-Partition can contains candidate points. Candidate points are points in the Voronoi cells adjacent to the kNN's cells. The previously calculated 1NN can be added to the kNN-Partition and become the first entry in the entire list and adjacent points can be added to the Candidate-Partition.

A next step can be to update a graph (hereinafter referred to as Ref-Graph), which contains mappings between each point in the IP-List and points that it is referencing and points that are currently referencing it in IP-list. Ref-Graph is updated so that 1NN stores pointers to the candidate points and each candidate point stores a pointer to 1NN. A next step can be to perform garbage collection on the IP-List. Garbage collection process on the IP-List can be performed to remove from the Candidate-Partition any points that do not have points that are referencing it in IP-List. Since all points in the Candidate-Partition are being referenced by 1NN, no points are removed. Garbage collection is performed on the IP-List every time the Ref-Graph is updated.

The next NN can be found and appended to kNN-Partition. This next NN can be processed as with 1NN, the Ref-Graph can be updated, a garbage collection on the IP-List is performed, and the next NN is found. The steps can be repeated until the initial kNN is found.

A next step can be to generate split points and maintain results. Split points can be generated by connecting all adjacent interest point pairs from the sorted IP-List and stored into a min-heap of split points (hereinafter referred to as S-Heap). In certain embodiments, a mapping between each split point and the pair of adjacent interest points that correspond to said split point is not required. In these embodiments, if a split point references on the first of the pair, the second can be easily retrieved by accessing the first's next node in IP-List. For instance, in FIG. 6, $sp_6$ only points to $p_{44}$ instead of keeping an additional pointer to $p_9$ as $p_{44}$'s adjacent node is $p_9$.

The IP-List can be continuously maintained and the kNN can be reported progressively. As a query point q runs into a split point, split points can be either added or deleted from S-Heap while the order of all interest points in IP-List is maintained. When a split point is encountered, there can be multiple scenarios. A first possible scenario can that a split point is generated by two points in the kNN-Partition is generated. In this instance the two points in the kNN-Partition are swapped and the change in the kNN-Partition is output as a kNN result. In a second scenario, the split point was generated using one point p in the kNN-Partition and one point q in the Candidate-Partition. In this instance, the two points can be swapped, the point q can be process as described above, the Ref-Graph can be updated as described above, a garbage collection on the IP-List can be performed, and the change in kNN-Partition can be output as a kNN result. A third scenario can be a split point generated by two points in the Candidate-Partition. In this instance, the two points can be swapped.

Another step can be to remove and discard split points from the S-Heap that reference nodes in the IP-List that contain either of the two swapped interest points. Split points for each newly adjacent pair of points in IP-List can be generated and inserted into the S-Heap. These steps can be iteratively performed until a query termination condition is reached, e.g. when q encounters or reaches a split point, the distance between query point q and the top of the S-Heap is less than or equal to a specified threshold the next split point in S-Heap is farther than the endpoint of the specified trajectory with respect to q, or the S-Heap is empty. When any of these conditions is reached, the PCkNN can end.

Figure 6:
FIG. 6 shows an example illustrating the swapping of two interest points when a query point reaches a swap split point.

An illustration of swapping is shown in FIG. 6. When the query point reaches the next swap split point sp6, interest points p9 and p44 can be retrieved. The interest points can be subsequently swapped in the IP-List. Given two interest points $p_i$ and $p_{i+1}$ that were retrieved before a swap operation and after the query point encounters the next split point in the S-Heap, the set of newly adjacent pairs is defined as:

$$\{<p_{i-1},p_{i+1}>,<p_{i+1},p_i>,<p_i,p_{i+2}>\} \text{ if } 1 \le i \le n-3$$

$$\{<p_{i-1},p_{i+1}>,<p_{i+1},p_i>\} \text{otherwise if } 1 \le i \le n-2$$

$$\{<p_{i+1},p_i>,<p_i,p_{i+2}>\} \text{otherwise if } 0 \le i \le n-3$$

$$\{<p_{i+1},p_i>\} \text{otherwise if } 0 \le i \le n-2 \qquad (7)$$

where n is the number of elements in the IP-List.

As seen FIG. 6, $p_i$=p9 and $p_{i+1}$=p44. The set of newly adjacent pairs of interest points in the IP-List is {<p11, p44>, <p44, p9>, <p9, p81>}. For each unique point in this set, their swap split points (sp6, sp9, and sp8) are retrieved in the S-Heap as all interest points in the IP-List have a pointer or reference to their respective split point in the heap. Split points sp6, sp9, and sp8 are removed from the S-Heap and discarded. The next swap points (sp112-sp114) for each pair of interest points in the IP-List are generated, pointers/references to and from their respective interest points in the IP-List are allocated, and they are inserted into the S-Heap. Although sp114 is not shown in FIG. 6, it should be understood that sp114 is inserted into the middle of the S-Heap for <p9, p81>.

Algorithms have been disclosed in the foregoing for the effective resolution of continuous k nearest neighbor queries and that return results in a progressive fashion (i.e. predictive, real time, or historical). While the foregoing exemplary embodiments and examples have been presented, they do not limit the scope of the invention and its use cases but serve as illustrations of use cases. That is to say that neither a GPS, database, smartphone, smartphone application, nor any of the technologies in the exemplary embodiments need to be used in the deployment of embodiments of the present invention. Certain embodiments can be implemented locally, remotely, on an internet-enabled or non-Internet-enabled personal computer (PC), server, smartphone, any device or equipment, or any combination of the above, all possibly interconnected via a wired or wireless network.

In an embodiment of the subject invention, a system can detect object moving in a through a universe of interest points. A split point set of the trajectory of the object can be defined recursively as the first point of the trajectory and all subsequent points of the trajectory where the ordered list of the k nearest interest points differs from that list for the previous split point on the trajectory. A kNN query (q), which for a given reference point and a given integer k, can output the k interest points that are nearest to said reference point. The continuous version of said query with respect to said trajectory is defined as said query being potentially evaluated at any time as referencing the location of the moving object at said time on said trajectory. That is for any time t, q(t) would result in a set of k interest points that are nearest to the location of the moving object at time t.

A query computing device comprising a computer readable medium storing and indexing interest points by using a VoR-tree and storing instructions that when executed (e.g., by a processor) evaluates the continuous query by performing the following steps: an initial step can be, receiving a continuous kNN query from the querying device, a next step can be initially, letting the reference point be the beginning of the trajectory of the object. A next step can be, computing an initial set comprised of the k interest points nearest to the reference point and the set of their adjacent neighbor interest points (as defined in the Voronoi Diagram), by using a kNN algorithm based on Voronoi R-tree. A next step can be, building a list (hereinafter referred to as Candidate-Output-List) to store all the interest points contained in the initial set, where all interest points in the list are ordered by their distance to the reference point. The Candidate-Output-List comprises two partitions: the first partition initially contains the k nearest objects, and the second partition contains all of their adjacent neighbors, A next step can be, initializing a min-heap data structure (referred to hereinafter as Candidate-Split-Point-List) to initially contain candidate split points computed as follows: (i) for each point in the Candidate-Output-List consider the perpendicular bisector between said point and the subsequent point in the Candidate-Output-List, (ii) if said bisector intersects with the trajectory then add the nearest (to said point) intersection as a candidate split point to said Candidate-Split-Point-List, and (iii) maintain the contents of Candidate-Split-Point-List ordered by their distance to the reference point and linking each point in the Candidate-Split-Point-List to the two points in Candidate-Output-List from which said Candidate-Split-Point-List point was computed.

A next step can be, iteratively, performing the following steps until a termination condition is reached: (i) move the reference point to the candidate split point that is popped from the Candidate-Split-Point-List (the reference point is the hypothetical position of the moving object), (ii) from the Candidate-Output-List, swap the two interest points (s1, s2) linked from said Candidate-Split-Point-List point (i.e. swap the two points s1, s2 from which the Candidate-Split-Point-List point was computed, into s2, s1, whereby the Candidate-Output-List will become ordered by the distance to the new reference point), (iii) denote the preceding to s2 point in Candidate-Output-List as s0 and the succeeding point to s2 as s3, (iv) remove form the Candidate-Split-Point-List the candidate split points that were computed using the pairs (s0, s1), (s1, s2) and (s2, s3), (v) for each of the three pairs (s0, s2), (s2, s1), and (s1, s3), add to the Candidate-Split-Point-List the nearest (to the reference point) intersection point (if any) of the trajectory and the perpendicular bisector of said pair, (vi) if prior to the swap s1 was in the first partition of the Candidate-Output-List while s2 was in its second partition then perform the following: (vi)(a) determine and remove s1's adjacent neighbors (as defined in the Voronoi Diagram) from the Candidate-Output-List if said neighbors are not adjacent neighbors (as defined in the Voronoi Diagram) of any points in the first partition, and remove form the Candidate-Split-Point-List the candidate split points that are linked to said removed s1's adjacent neighbors in the Candidate-Output-List, and (vi)(b) determine and add s2's adjacent neighbors (as defined in the Voronoi Diagram) to Candidate-Output-List if said neighbors are not in the second partition. For each of the new pairs that is formed as the result of adding said s2's adjacent neighbors to the Candidate-Output-List, add to the Candidate-Split-Point-List the nearest (to the reference point) intersection point (if any) of the trajectory and the perpendicular bisector of said new pair; and (viii) produce output by delivering the content of the first partition of the current Candidate-Output-List (and may include additional information, such as said candidate split point) if none of s1, s2 in the second partition.

In another embodiment of the subject invention, the query device is the same device as the query-computing device.

In another embodiment, determining whether s1's adjacent neighbors are not the k-nearest neighbors' (in the first partition) adjacent neighbors and whether s2's adjacent neighbors are not in the second partition, is further optimized by using adjacent neighbors reference graph to represent the adjacent neighbor relationship in the Candidate-Output-List.

In another embodiment, an adjacent neighbor's reference graph is implemented by using reference pointer in the memory of a computer readable medium. The reference pointer can be stored in one element in Candidate-Output-List and point to the other element in Candidate-Output-List to represent the neighborhood relationship in Voronoi diagram of two interest point in the Candidate-Output-List.

In yet another embodiment, the termination condition is one of the following situations: the reference point becomes a split point or a specified point in the trajectory path, or the Candidate-Split-Point-List is empty. A querying device includes a mobile device, tablet, in-car personal computer. The querying device can include a graphical user interface to input a search query and receive the search query results. A query computing device can be a query computer or server, or cloud computing based technology.

Figure 7:
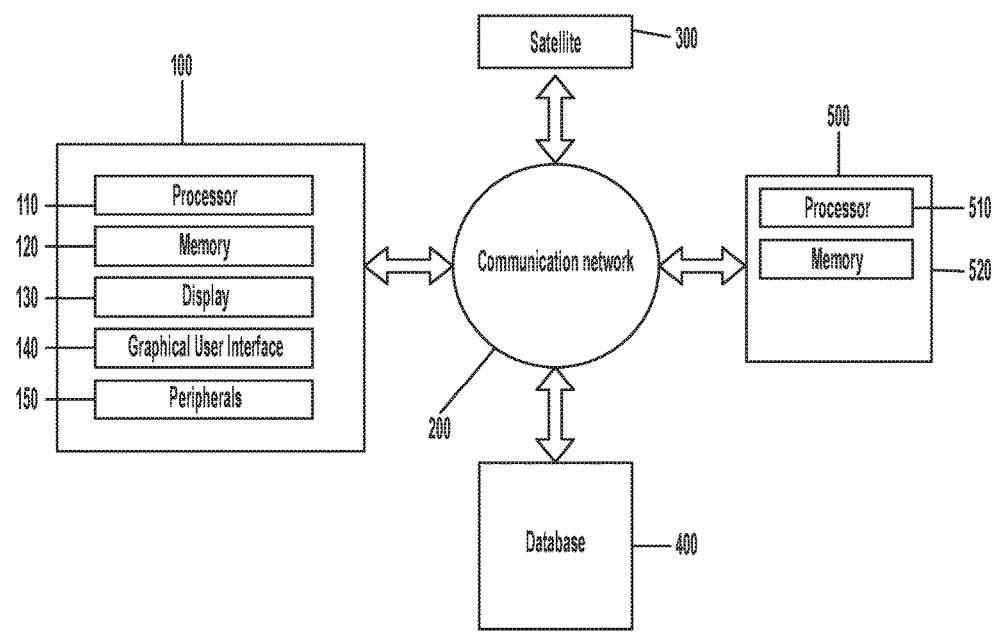
FIG. 7 is a block diagram of an embodiment of a computer-based system for performing a k-nearest neighbor location-based service.

FIG. 7 is an embodiment of the system and includes a querying device 100, including a mobile device, wherein the querying device 100 may transmit spatial, temporal information, and other notifications to a query computing device 500. A querying device 100 and the query computing device can communicate with a location based service related satellite 300, a database of interest points and geolocations of the interest points 400 through one or more modes of communication or communication networks 200.

The querying device can comprise a processor, 110, memory, 120, a graphical user interface 140 seen on a display 130 and peripherals 150. The query computing device can include a processor 510 and memory 520.

The communication network 200 can comprise a communications port, a wired transceiver, a wireless transceiver, and/or a network card. The communication network can communicate using technologies such as Ethernet, fiber optics, microwave, xDSL (Digital Subscriber Line), Wireless Local Area Network (WLAN) technology, wireless cellular technology, BLUETOOTH technology and/or any other appropriate technology.

An embodiment of the query computing device can be configured to perform any feature or any combination of features described above as performed by the query computing device. In such an embodiment, the non-transitory computer readable medium may store instructions which, when executed by the processor, cause the processor to perform any feature or any combination of features described above.

The methods and processes described herein can be embodied as code and/or data. The software code and data described herein can be stored on one or more machine-readable media (e.g., computer-readable media), which may include any device or medium that can store code and/or data for use by a computer system. When a computer system and/or processor reads and executes the code and/or data stored on a computer-readable medium, the computer system and/or processer performs the methods and processes embodied as data structures and code stored within the computer-readable storage medium.

It should be appreciated by those skilled in the art that computer-readable media include removable and non-removable structures/devices that can be used for storage of information, such as computer-readable instructions, data structures, program modules, and other data used by a computing system/environment. A computer-readable medium includes, but is not limited to, volatile memory such as random access memories (RAM, DRAM, SRAM); and non-volatile memory such as flash memory, various read-only-memories (ROM, PROM, EPROM, EEPROM), magnetic and ferromagnetic/ferroelectric memories (MRAM, FeRAM), and magnetic and optical storage devices (hard drives, magnetic tape, CDs, DVDs); network devices; or other media now known or later developed that is capable of storing computer-readable information/data. Computer-readable media should not be construed or interpreted to include any propagating signals. A computer-readable medium of the subject invention can be, for example, a compact disc (CD), digital video disc (DVD), flash memory device, volatile memory, or a hard disk drive (HDD), such as an external HDD or the HDD of a computing device, though embodiments are not limited thereto. A computing device can be, for example, a laptop computer, desktop computer, server, cell phone, or tablet, though embodiments are not limited thereto.

A greater understanding of the present invention and of its many advantages may be had from the following examples, given by way of illustration. The following examples are illustrative of some of the methods, applications, embodiments and variants of the present invention. They are, of course, not to be considered as limiting the invention. Numerous changes and modifications can be made with respect to the invention.

Example 1

A user driving in a vehicle with a Global Positioning System (GPS) application installed on an internet enabled smartphone can inquire about the closest hotels at the beginning of an 18-hour driving trip. As the user is driving, the user would like to know, the 10 closest hotels at any point along the planned route. Using the user's current geographical location, driving route, and the data bound by the Voronoi diagram, the service can determine the 10 closest hotels at any point during the trip. The names and locations of can returned to the GPS application on the smart phone and sequentially ordered by their distance to the user's current location.

Example 2

A user on an extended driving trip can decide to get off the next exit on the highway. A smart phone application indicates that hotel H is currently closest. The application can also indicate that once the user gets off the next highway exit, then hotel E will be closest. This information can be displayed within the application because of the capability of efficient progressive re-computation of queries without reposting them. The user can interact with the application and indicate that the user would like to change the destination to hotel E.

Example 3

A user can see an advertisement for a restaurant chain, though the restaurant may be located in an opposite direction in the path of travel. The user can change direction and head towards the restaurant. The application can notify the user that there has been a change in the directions of the original driving route. However, even though the direction has changed, the user remains on the original path. Therefore, the service does not need to regenerate the swap points as they remain the same.

Example 4

In a particular embodiment, a system or method can predict the 5 nearest interest points during a drive along a path between two locations.

Example 5

In a particular embodiment, a system or method can report and update in real time the 3 nearest interest points during a walk from two locations.

It should be understood that the examples and embodiments described herein are for illustrative purposes only and that various modifications or changes in light thereof will be suggested to persons skilled in the art and are to be included within the spirit and purview of this application.

All patents, patent applications, provisional applications, and publications referred to or cited herein (including those in the "References" section) are incorporated by reference in their entirety, including all figures and tables, to the extent they are not inconsistent with the explicit teachings of this specification.

What is claimed is:

1. A method for performing a continuous computer-based k-nearest neighbors (kNN) query in location based services for moving objects, which outputs ordered query results in a continuous and progressive manner, comprising:
providing a query computing device comprising a computer readable medium comprising instructions that when executed causes at least one processor to:
receive, by a receiving device, a continuous k-nearest neighbor (kNN) query from a querying device;
detect, by a detecting device, an initial position, a current position, and a trajectory path of the querying device, the initial position being considered a reference point;
continuously detect a set of interest points surrounding the querying device along the trajectory path;
continuously map the set of interest points into a Voronoi diagram;
store and index the set of interest points using a Voronoi R-tree (VoR-tree);
continuously compute a set of k-nearest interest points to the querying device;
construct a list of the k-nearest interest points, the list being ordered on each interest point's distance from the querying device;
partition the ordered list, a first partition containing the k-nearest interest points, and a second partition containing all adjacent neighbors of the k-nearest interest points;

initialize a min-heap data structure to contain a plurality of split points, a split point being computed by computing a perpendicular bisector for each interest point and subsequent interest point in the ordered list and then detecting each point of intersection of each perpendicular bisector and the trajectory path, each point of intersection being a split point;

insert each split point into the min-heap data structure in ordered pairs, a second interest point of a pair being the first interest point in a directly subsequent pair;

maintain an order of the min-heap data structure based upon each point of intersection's distance from the querying device;

link each split point with its pair of interest point and subsequent interest point;

perform steps a)-e) until a termination condition is reached:
  a) detect the querying device traversing a split point;
  b) move the position of the reference point from the initial position to a position of the traversed split point;
  c) in the list swap the position of the interest point and subsequent adjacent interest point (s 1, s2) linked to the traversed split point thereby causing the list to be ordered by the distance to the position of the traversed split point;
  d) remove from the min-heap data structure, each split point being computed using pairs (s0, s1), (s1, s2) and (s2, s3); and
  e) for each of pairs (s0, s2), (s2, s1), and (s1, s3), add to the min-heap data structure a nearest (to the reference point) intersection point of the trajectory and the perpendicular bisector of each respective pair; and continuously transmit the k-nearest interest points to the mobile device.

2. The method of claim 1, prior to the swap interest point s1 being in the first partition and interest point s2 being in the second partition, the processor being further configured to:
  identify and remove each of interest point s1's adjacent neighbors that are not adjacent neighbors of any interest points in the first partition, as defined in the Voronoi Diagram, from the list;
  remove from the min-heap data structure each split points linked to the removed s1's adjacent neighbors in the ordered list;
  identify and add s2's adjacent neighbors that are not in the second partition, as defined in the Voronoi Diagram, to the ordered list; and
  for each new pair formed as the result of adding s2's adjacent neighbors to the ordered list, add to the min-heap data structure the nearest (to the reference point) intersection point of the trajectory path and the perpendicular bisector of the new pair.

3. The method of claim 2, the processor being further configured to:
  optimize identification of interest point s1's adjacent neighbors that are not adjacent neighbors of the k-nearest interest points by utilizing a graph which contains mappings between each interest point sk in the ordered list and each interest point that sk is referencing and each interest point that is referencing sk in the list; and
  optimize identification of interest point s2's adjacent neighbors that are not in the second partition by utilizing a graph which contains mappings between each interest point sk in the ordered list and each interest point that sk is referencing and each interest point that is referencing sk in the list.

4. The method of claim 3, the graph being implemented by using a reference pointer in the memory of a computer readable medium, the reference pointer being stored in one element in the ordered list and point to another element in list to represent the relationship in the Voronoi diagram of two interest points in the ordered list.

5. The method of claim 1, when interest points s1 and s2 are not in the second partition, the processor being further configured to:
  continuously transmit the first partition to the querying device.

6. The method of claim 1, the query computing device being the same as the querying device.

7. The method of claim 1, the processor further being configured to:
  use pointers in the memory of the computer readable medium to maintain the linking between each split point in the min-heap data structure and each corresponding two interest points in the ordered list used to generate each respective split point.

8. The method of claim 1, the termination condition comprising one of the following situations: the reference point becomes a split point or a specified point in the trajectory path; or the min-heap data structure is empty.

9. The method of claim 1, an interest point being at least one hospital, medical office, restaurant, gas station, landmark, hotel, structure, service provider, vendor, retailer, store, or any combination thereof.

10. The method of claim 1, The method of claim 1, the query computing device being an external device communication with the querying device through a communications network.

11. A system for performing computer-based continuous k-nearest neighbors (kNN) query in location based services for moving objects, which outputs ordered query results in a continuous and progressive manner, the system comprising:
  a querying device;
  a database containing geo-locations of at least one hospital, medical office, restaurant, gas station, landmark, hotel, structure, service provider, vendor, retailer, store, or any combination thereof;
  a communication network connecting the query device and database, and
  a query computing device in communication with the database and querying device through the communication network and comprising a computer readable medium comprising instructions that when executed causes at least one processor to:
    receive a continuous k-nearest neighbor (kNN) query from a querying device;
    detect an initial position, a current position, and a trajectory path of the querying device, the initial position being considered a reference point;
    continuously detect a set of interest points surrounding the querying device along the trajectory path;
    continuously map the set of interest points into a Voronoi diagram;
    store and index the set of interest points using a Voronoi R-tree (VoR-tree);
    continuously compute a set of k-nearest interest points to the querying device;

construct a list of the k-nearest interest points, the list being ordered on each interest point's distance from the querying device;

partition the ordered list, a first partition containing the k-nearest interest points, and a second partition containing all adjacent neighbors of the k-nearest interest points;

initialize a min-heap data structure to contain a plurality of split points, a split point being computed by computing a perpendicular bisector for each interest point and subsequent interest point in the ordered list and then detecting each point of intersection of each perpendicular bisector and the trajectory path, each point of intersection being a split point;

insert each split point into the min-heap data structure in ordered pairs, a second interest point of a pair being the first interest point in a directly subsequent pair;

maintain an order of the min-heap data structure based upon each point of intersection's distance from the reference point;

link each split point with its pair of interest point and subsequent interest point; and perform steps a)-e) until a termination condition is reached:
  a) detect the querying device traversing a split point;
  b) move the position of the reference point from the initial position to a position of the traversed split point;
  c) in the list swap the position of the interest point and subsequent adjacent interest point (s1, s2) linked to the traversed split point thereby causing the list to be ordered by the distance to the position of the traversed split point;
  d) remove from the min-heap data structure, each split point being computed using pairs (s0, s1), (s1, s2) and (s2, s3); and
  e) for each of pairs (s0, s2), (s2, s1), and (s1, s3), add to the min-heap data structure a nearest (to the reference point) intersection point of the trajectory and the perpendicular bisector of each respective pair; and continuously transmit the k-nearest interest points to the mobile device.

12. A system for performing computer-based continuous k-nearest neighbors (kNN) query in location based services for moving objects, which outputs ordered query results in a continuous and progressive manner, the system comprising:

a querying device; and a query computing device in communication with the querying device and comprising a computer readable medium comprising instructions that when executed causes at least one processor to:

receive a continuous k-nearest neighbor (kNN) query from a querying device;

detect an initial position, a current position, and a trajectory path of the querying device, the initial position being considered a reference point;

continuously detect a set of interest points surrounding the querying device along the trajectory path;

continuously map the set of interest points into a Voronoi diagram;

store and index the set of interest points using a Voronoi R-tree (VoR-tree);

continuously compute a set of k-nearest interest points to the querying device;

construct a list of the k-nearest interest points, the list being ordered on each interest point's distance from the reference point;

partition the ordered list, a first partition containing the k-nearest interest points, and a second partition containing all adjacent neighbors of the k-nearest interest points;

initialize a min-heap data structure to contain a plurality of split points, a split point being computed by computing a perpendicular bisector for each interest point and subsequent interest point in the ordered list and then detecting each point of intersection of each perpendicular bisector and the trajectory path, each point of intersection being a split point;

insert each split point into the min-heap data structure in ordered pairs, a second interest point of a pair being the first interest point in a directly subsequent pair;

maintain an order of the min-heap data structure based upon each point of intersection's distance from the reference point;

link each split point with its pair of interest point and subsequent interest point;

perform steps a)-e) until a termination condition is reached:
  a) detect the querying device traversing a split point;
  b) move the position of the reference point from the initial position to a position of the traversed split point;
  c) in the list swap the position of the interest point and subsequent adjacent interest point (s1, s2) linked to the traversed split point thereby causing the list to be ordered by the distance to the position of the traversed split point;
  d) remove from the min-heap data structure, each split point being computed using pairs (s0, s1), (s1, s2) and (s2, s3); and
  e) for each of pairs (s0, s2), (s2, s1), and (s1, s3), add to the min-heap data structure a nearest (to the reference point) intersection point of the trajectory and the perpendicular bisector of each respective pair; and transmit the k-nearest interest points to the mobile device.

13. The system of claim 12, prior to the swap interest point s1 being in the first partition and interest point s2 being in the second partition, the processor being further configured to:

identify and remove each of interest point s1's adjacent neighbors that are not adjacent neighbors of any interest points in the first partition, as defined in the Voronoi Diagram, from the list;

remove from the min-heap data structure each split points linked to the removed s1's adjacent neighbors in the ordered list;

identify and add s2's adjacent neighbors that are not in the second partition, as defined in the Voronoi Diagram, to the ordered list; and for each new pair formed as the result of adding s2's adjacent neighbors to the ordered list, add to the min-heap data structure the nearest (to the reference point) intersection point of the trajectory path and the perpendicular bisector of the new pair.

14. The system of claim 13, the processor being further configured to:

optimize identification of interest point s1's adjacent neighbors that are not adjacent neighbors of the k-nearest interest points by utilizing a graph which contains mappings between each interest point sk in the ordered list and each interest point that sk is referencing and each interest point that is referencing sk in the list; and optimize identification of interest point s2's adjacent neighbors that are not in the second partition by utilizing a graph which contains mappings between each interest point sk in the ordered list and each interest point that sk is referencing and each interest point that is referencing sk in the list.

15. The system of claim 14, the graph being implemented by using a reference pointer in the memory of a computer readable medium, the reference pointer being stored in one element in the ordered list and point to another element in list to represent the relationship in the Voronoi diagram of two interest points in the ordered list.

16. The system of claim 12, when interest points s1 and s2 are not in the second partition, the processor being further configured to:

transmit the first partition to the querying device.

17. The system of claim 12, the query computing device being the same as the querying device.

18. The system of claim 12, the processor further configured to:

use pointers in the memory of the computer readable medium to maintain the linking between each split point in the min-heap data structure and each corresponding two interest points in the ordered list used to generate each respective split point.

19. The system of claim 12, the termination condition comprising one of the following situations: the reference point becomes a split point or a specified point in the trajectory path; or the min-heap data structure is empty.

20. The system of claim 12, an interest point being at least one of a hospital, medical office, restaurant, gas station, landmark, hotel, structure, service provider, vendor, retailer, store, or any combination thereof.

* * * * *